July 20, 1926.

H. J. DENHAM ET AL 1,593,161

METHOD OF ASCERTAINING THE MOISTURE CONTENT OF CEREALS AND THE LIKE

Filed June 6, 1925  3 Sheets-Sheet 1

H. J. Denham &
G. Watts
INVENTOR

By Marks & Clerk
Attys

July 20, 1926.

H. J. DENHAM ET AL 1,593,161

METHOD OF ASCERTAINING THE MOISTURE CONTENT OF CEREALS AND THE LIKE

Filed June 6, 1925  3 Sheets-Sheet 2

Patented July 20, 1926.

1,593,161

UNITED STATES PATENT OFFICE.

HUMPHREY JOHN DENHAM AND GEORGE WATTS, OF MANCHESTER, ENGLAND, ASSIGNORS TO HENRY SIMON LIMITED, OF MANCHESTER, ENGLAND, A BRITISH COMPANY.

METHOD OF ASCERTAINING THE MOISTURE CONTENT OF CEREALS AND THE LIKE.

Application filed June 6, 1925, Serial No. 35,387, and in Great Britain June 30, 1924.

In known methods of measuring the moisture content of cereals and the like, a sample is placed in an oven and kept therein at a temperature not exceeding 115° C., for a period of four or more hours. The moisture content is calculated from the difference in the weight of the sample before and after its subjection to such heat treatment. If the temperature is allowed to exceed 115° C. a proportion of the starch in the sample is converted into dextrin with the release of several molecules of water, which results in a false ascertainment of the moisture content.

The object of this invention is to expedite the accurate determination of the moisture content and it comprises the subjection of the test samples to a current of air in association with a temperature exceeding a critical temperature, such as aforesaid, whereby the moisture is very rapidly removed from the said samples without dextrinization or appreciable chemical change of the same.

The accompanying explanatory drawings illustrate one convenient construction of oven for use in measuring the moisture content of cereals and the like in accordance with our invention.

Figure 1:
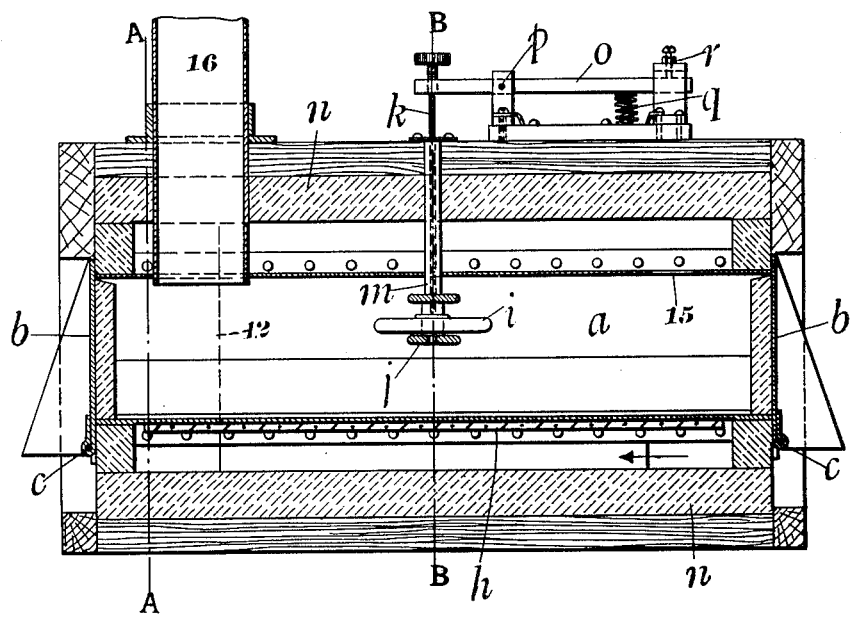
Figure 1 is a sectional elevation and Figure 2 a sectional plan view.
Figure 6:
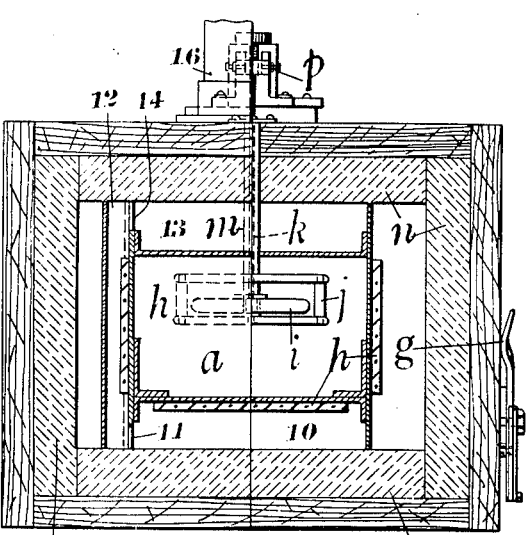

The left hand side of Figure 6 is a cross sectional view on the line A A of Figure 1, and the right hand side is a cross sectional view on the line B B of Figure 1.

Figure 7:
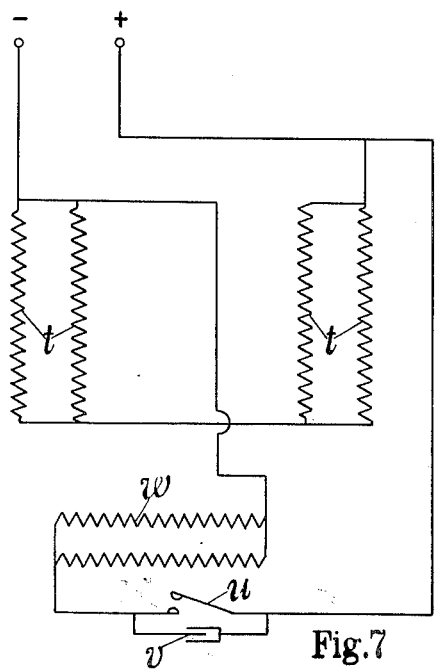
Figure 8:
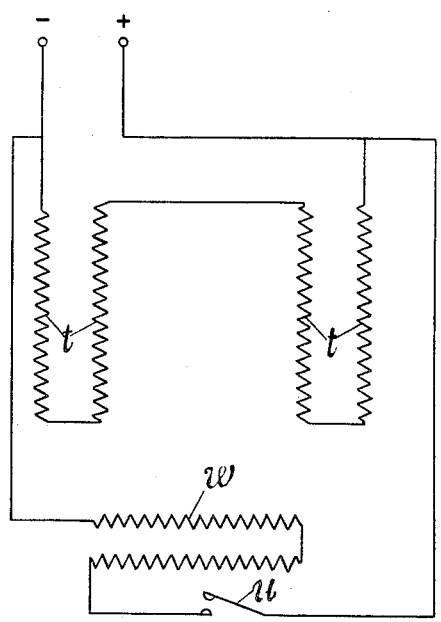

Figures 7 and 8 are typical diagrams of the electric connections.

The same reference letters in the different views indicate the same parts.

The oven comprises a horizontally disposed copper or other tubular container $a$ which may be rectangular in section and fitted at each end with a sliding or other door $b$. The doors are carried by spindles $c$ which are interconnected by levers and links $d$, $e$, $f$ so that they are opened and closed simultaneously by the handle $g$. The said tube or container is fitted with electrical heating units $h$ and means are provided for the control of the current supply thereto; the said means include a thermostat or capsule $i$ supported in the tube $a$ by the frame $j$ and having a rod $k$ resting thereon. The said rod is carried in the tube $m$ extending through the oven wall $n$ as shown. The upper end of the rod serves to turn a lever $o$ about its fulcrum $p$. A compression coil spring $q$ acting on $o$ serves to hold the rod $k$ against the capsule $i$. The lever $o$ forms part of the electric circuit of the heating elements, current flowing through the circuit when the lever is in engagement with the contact $r$, that is when the capsule is not expanded sufficiently, due to the temperature in $a$ not being excessive, to raise the rod $k$. Figure 8 shows a typical electrical diagram for the oven for a low voltage current such as 100 volts direct current. The heating elements are wired in parallel as shown at $t$. The capsule operates the switch $u$ across which a condenser $v$ may be placed. The temperature to which the oven is heated is regulated by resistance $w$. In the arrangement shown in Figure 8, the heating elements are wired in series. The temperature control arrangements do not in themselves form any part of this invention.

Figure 2:
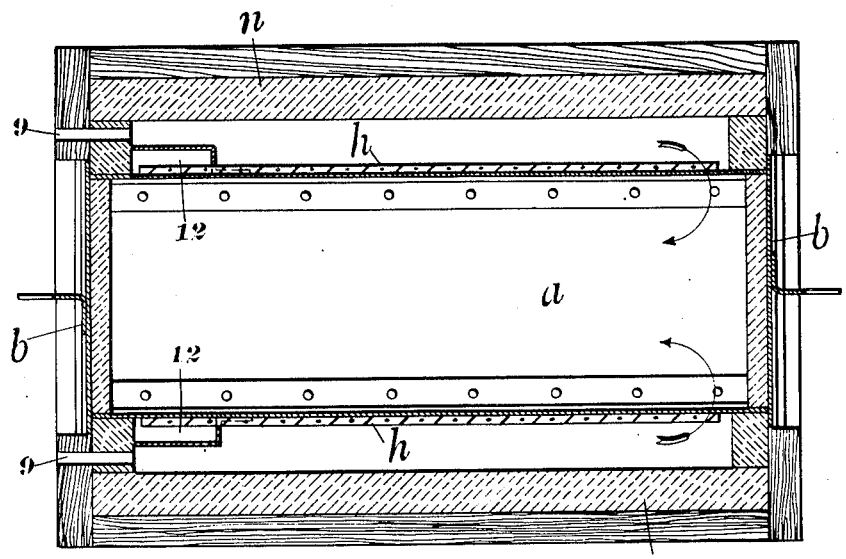
Figure 3:
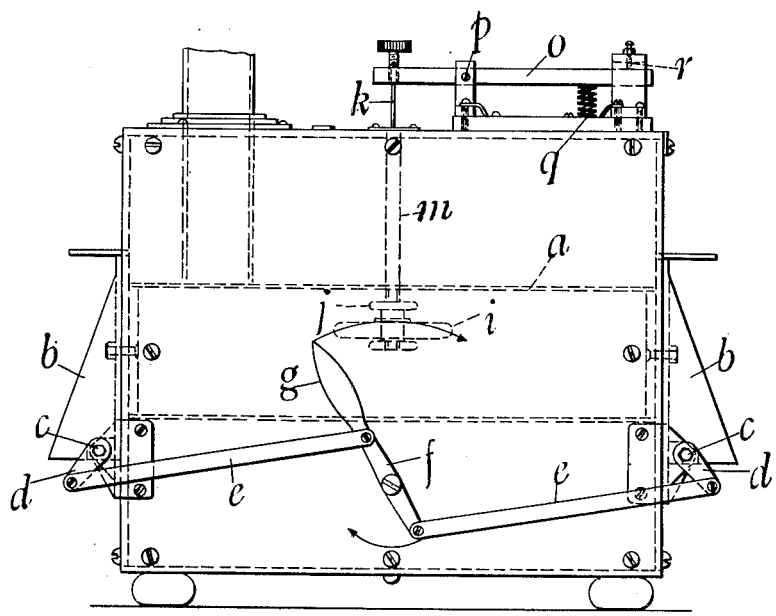
Figure 3 is a side elevation and Figure 4 a plan view.
Figure 4:
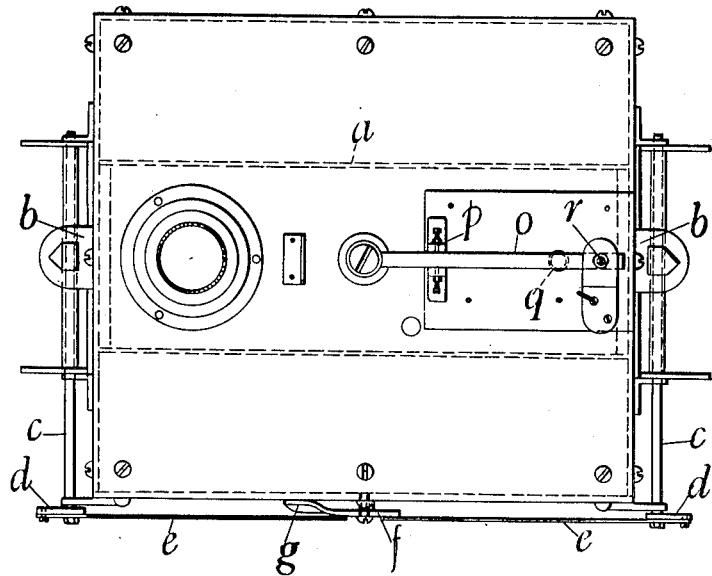
Figure 5:
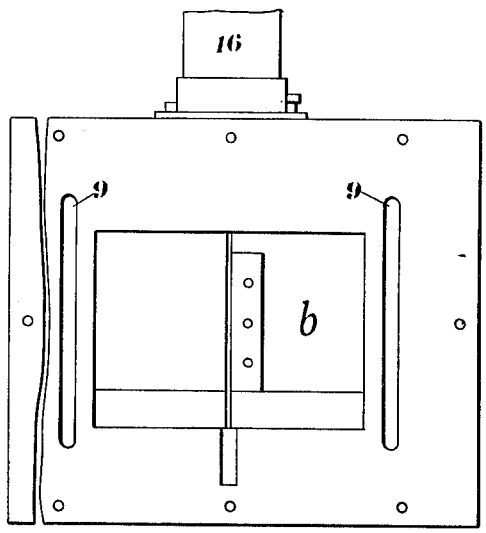
Figure 5 is an end view looking from left to right of Figure 1.

The air which is to heat the material being tested in the oven $a$ is drawn into the structure through passages 9 9, Figures 2 and 5, and passes along the sides of the exterior of the oven to the opposite end thereof. The air then passes into the channel 10 (Figures 1 and 6) beneath the oven by way of openings 11 in the side walls of such channel and travels to the opposite end of the oven where it enters the two vertical ducts 12, 12 (Figures 1, 5, and 6) and gains access to the channel 13 above the oven by way of openings 14. After travelling along the top of the oven in the channel 13, the air enters the oven $a$ by apertures 15 in the top thereof. The waste air leaves the oven by the chimney 16.

By circulating the air in the manner indicated, it has its temperature raised to a comparatively high degree, preferably 150° C., before entering the container, in flowing through which, on its way to the outlet chimney or the like, it passes over the samples placed therein for the heat treatment. With such temperature we find that an accurate moisture determination may be made in fifteen minutes.

A series of samples may be placed in series in the container and passed therethrough by hand by intermittent movements, the arrangement being such that each time a fresh sample is introduced at one end of the container a dried or treated sample is withdrawn from the opposite end. The samples may be placed on trays and a clock or timing device be arranged to give periodic signals as to the times for the insertion and withdrawal of the samples.

The oven and the external air ducts aforesaid may be enclosed by a heat insulating casing or wall $n$ as shown.

By subjecting the cereals to the action of a strong current of preheated air as before referred to, we find that although the temperature to which the cereals are exposed is above that at which dextrinization of starch normally occurs, such a heavy evaporation takes place from the cereals that the actual temperature of the sample is maintained below that at which dextrinization of starch occurs. We are thereby enabled to obtain an accurate estimation of the moisture content of the sample in a relatively short time.

We claim:—

The method of rapidly testing samples of cereals and the like to ascertain their moisture content characterized in this, that the samples are subjected to a strong current of air whilst exposed to a temperature exceeding the critical temperature at which dextrinization and chemical change of the starch normally occurs.

In testimony whereof we have signed our names to this specification.

HUMPHREY JOHN DENHAM.
GEORGE WATTS.